(12) United States Patent
Ichikawa et al.

(10) Patent No.: US 9,168,822 B2
(45) Date of Patent: Oct. 27, 2015

(54) CHARGING SYSTEM

(75) Inventors: Shinji Ichikawa, Toyota (JP); Kenji Itagaki, Toyota (JP); Masaru Sasaki, Toyota (JP); Wanleng Ang, Okazaki (JP); Kenji Murasato, Toyota (JP); Atsushi Mizutani, Toyota (JP); Yukihiro Yamamoto, Okazaki (JP); Taira Kikuchi, Toyota (JP); Yoshikazu Kataoka, Seto (JP); Shingo Ieda, Toyota (JP); Hiroki Sawada, Toyota (JP); Yoshinori Fujitake, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 976 days.

(21) Appl. No.: 13/322,526

(22) PCT Filed: May 28, 2009

(86) PCT No.: PCT/JP2009/059746
§ 371 (c)(1),
(2), (4) Date: Feb. 7, 2012

(87) PCT Pub. No.: WO2010/137144
PCT Pub. Date: Dec. 2, 2010

(65) Prior Publication Data
US 2012/0133326 A1 May 31, 2012

(51) Int. Cl.
*H02J 7/00* (2006.01)
*H02J 7/16* (2006.01)
(Continued)

(52) U.S. Cl.
CPC ............... *B60K 6/365* (2013.01); *B60K 6/445* (2013.01); *B60L 11/123* (2013.01); *B60L 11/14* (2013.01); *B60L 11/1812* (2013.01); *B60L 11/1814* (2013.01); *B60L 11/1816* (2013.01);
(Continued)

(58) Field of Classification Search
USPC ......... 320/109, 104, 107, 108, 130, 137, 152, 320/158, 163, 165; 439/310, 34, 352, 304, 439/166, 489, 138, 142
See application file for complete search history.

(56) References Cited

U.S. PATENT DOCUMENTS 5,417,579 A 5/1995 Yoshioka et al.
2010/0318250 A1 12/2010 Mitsutani

FOREIGN PATENT DOCUMENTS

JP B2-60-24539 6/1985
JP A-7-85926 3/1995
(Continued)

OTHER PUBLICATIONS

International Search Report mailed Aug. 25, 2009 issued in International Patent Application No. PCT/JP7009/059746 (with translation).

*Primary Examiner* — Edward Tso
*Assistant Examiner* — Alexis A Boateng
(74) *Attorney, Agent, or Firm* — Oliff PLC

(57) ABSTRACT

A charging system includes a locking device locking a connector provided at the end of a cable in the state where the connector is connected to an inlet provided in a vehicle; a release button for releasing locking by the locking device; a switch generating a signal indicating that the connector and the inlet are connected; a horn; and an ECU. In response to the operation of the release button, the switch stops generation of the signal. The ECU controls charging of a power storage device and detects whether the signal is issued or not. In the case where the ECU detects that generation of the signal is stopped during charging of the power storage device, the ECU causes the horn to issue an alarm.

3 Claims, 12 Drawing Sheets

(51) Int. Cl.
*B60K 6/365* (2007.10)
*B60K 6/445* (2007.10)
*B60L 11/12* (2006.01)
*B60L 11/14* (2006.01)
*B60L 11/18* (2006.01)
*B60L 15/00* (2006.01)
*H02J 7/02* (2006.01)
*B60K 1/02* (2006.01)

(52) U.S. Cl.
CPC ........... *B60L11/1825* (2013.01); *B60L 15/007* (2013.01); *H02J 7/027* (2013.01); *B60K 1/02* (2013.01); *B60L 2220/14* (2013.01); *B60L 2220/54* (2013.01); *B60L 2230/12* (2013.01); *B60W 2510/244* (2013.01); *Y02T 10/6217* (2013.01); *Y02T 10/6239* (2013.01); *Y02T 10/6269* (2013.01); *Y02T 10/641* (2013.01); *Y02T 10/7005* (2013.01); *Y02T 10/7077* (2013.01); *Y02T 10/7088* (2013.01); *Y02T 90/121* (2013.01); *Y02T 90/127* (2013.01); *Y02T 90/128* (2013.01); *Y02T 90/14* (2013.01)

(56) References Cited

FOREIGN PATENT DOCUMENTS

| | | |
|---|---|---|
| JP | A-2007-62642 | 3/2007 |
| JP | A-2007-236172 | 9/2007 |
| JP | A-2009-71900 | 4/2009 |
| WO | WO 2009/034572 A1 | 3/2009 |

CHARGING SYSTEM

TECHNICAL FIELD

The present invention relates to a charging system for charging a power storage device mounted in a vehicle by an external power supply.

BACKGROUND ART

In recent years, an electric vehicle, a hybrid vehicle, a fuel-cell vehicle and the like have attracted attention as an environmentally-friendly vehicle. These vehicles each are equipped with an electric motor generating a driving force for running and a power storage device storing electric power supplied to the electric motor.

The technique for charging the power storage device mounted in each of these vehicles by the power supply external to the vehicle is currently proposed. According to this technique, for example, the wall socket provided in a house and the inlet provided in the vehicle are connected via a charging cable, which allows the power storage device mounted in the vehicle to be charged by a household power supply. The vehicle capable of running with the electric power supplied from the power supply external to the vehicle will be hereinafter referred to as a "plug-in vehicle".

According to Japanese Patent Laying-Open No. 2007-236172 (Patent Literature 1), in the case where the power storage device mounted in a plug-in vehicle is charged by an external power supply, it takes a relatively long time to charge the power storage device as compared with the case where gasoline is supplied to a gasoline-powered vehicle. Accordingly, it is highly likely that the user is away from the vehicle at the time when charging of the power storage device is started. In this case, however, there are possibilities that the charging cable may be removed from the vehicle, and furthermore, the charging cable may be stolen.

The power supply device and the electrical device disclosed in Japanese Patent Laying-Open No. 2007-236172 include a power transmitting and receiving unit, and a connector capable of connecting a cable for electric power transmission and reception between the power transmitting and receiving unit and the electrical device external to the vehicle. A connection unit includes a lock mechanism locking the cable in the state where it is connected to the connector. The lock mechanism can be unlocked by a vehicle key.

Usually, the owner of the vehicle possesses a vehicle key. Accordingly, the above-described configuration can prevent a person other than the owner of the vehicle from removing the cable from the vehicle.

CITATION LIST

Patent Literature

PTL 1: Japanese Patent Laying-Open No. 2007-236172

SUMMARY OF INVENTION

Technical Problem

In the power supply device and the electrical device disclosed in Japanese Patent Laying-Open No. 2007-236172, the lock mechanism locks the cable in the state where the cable is connected to the connector, so that the cable can be prevented from being stolen. However, it is also conceivable that the lock mechanism may be destroyed to remove the cable from the vehicle.

An object of the present invention is to provide a technique that can reduce the possibility that the cable for connecting the external power supply and the vehicle is removed from the vehicle during charging of the power storage device mounted in the vehicle.

Solution to Problem

In summary, the present invention provides a charging system for charging a power storage device mounted in a vehicle by a power supply external to the vehicle. The charging system includes an inlet, a cable, a connector, a first locking device, a release button for releasing locking by the first locking device, a signal generator, a charger, a signal detection unit, and an alarm issuing unit. The inlet is provided in the vehicle for receiving electric power from the power supply. The cable includes an electric power line for transmitting the electric power from the power supply to the vehicle. The connector is provided at an end of the cable and is attachable to and detachable from the inlet. The first locking device is configured to lock the connector in a state where the connector is connected to the inlet. The signal generator is configured to generate a signal indicating that the connector is connected to the inlet and to stop generation of the signal in response to an operation of the release button. The charger is configured to charge the power storage device with the electric power input into the inlet. The charge control unit is configured to control charging of the power storage device by the charger. The signal detection unit is configured to detect the signal generated by the signal generator. The alarm issuing unit is configured to issue an alarm when the signal detection unit detects that the signal generator stopped generation of the signal during charging of the power storage device by the charger.

Preferably, the first locking device includes an engagement unit. The engagement unit engages with the inlet for locking connection between the connector and the inlet. The charging system further includes a second locking device and a lock control unit. The second locking device is configured to lock the engagement unit in a state where the engagement unit engages with the inlet. The lock control unit is configured to activate the second locking device when the signal detection unit detects the signal.

Preferably, the second locking device includes a movement restraining member. The movement restraining member restrains movement of the engagement unit by coming into contact with the engagement unit when the operation of the release button causes the engagement unit to move in a direction away from the inlet. An operation amount of the release button for bringing the engagement unit into contact with the movement restraining member is greater than the operation amount of the release button for stopping generation of the signal by the signal generator.

Preferably, the lock control unit is configured to release locking by the second locking device when the charge control unit terminates charging of the power storage device by the charger.

Preferably, the signal has a prescribed voltage. The signal generator includes a switch. The switch is configured to connect a signal line for transmitting the signal and a voltage line receiving the prescribed voltage when the release button is not operated, and to disconnect the signal line and the voltage line from each other when the release button is operated.

Advantageous Effects of Invention

The present invention can reduce the possibility that the cable for connecting the external power supply and the vehicle may be removed from the vehicle during charging of the power storage device mounted in the vehicle.

DESCRIPTION OF EMBODIMENTS

Figure 1:
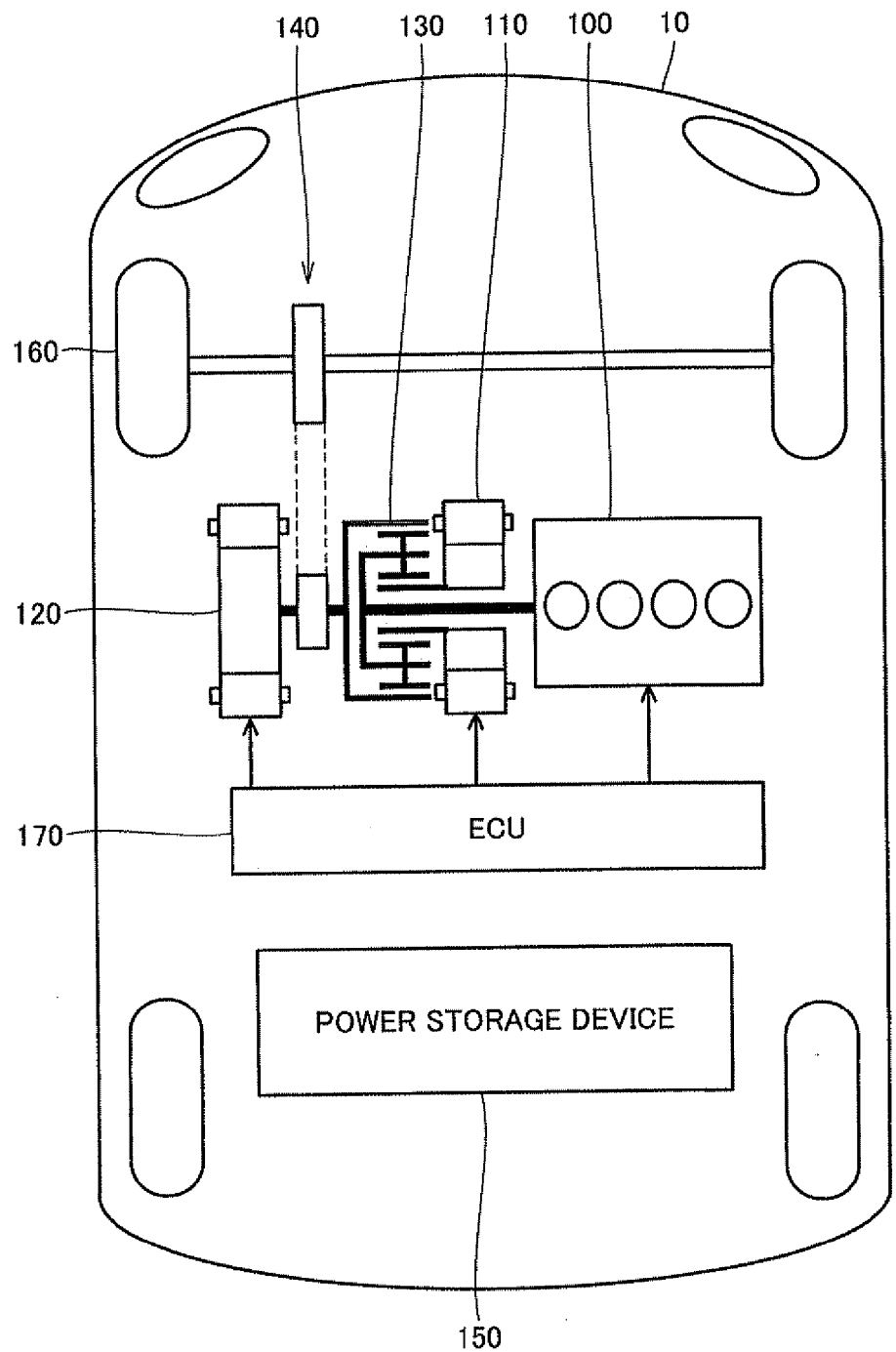
FIG. 1 is an entire block diagram of a hybrid vehicle shown as an example of a vehicle according to the embodiment of the present invention.

The embodiments of the present invention will be hereinafter described in detail with reference to the accompanying drawings, in which the same or corresponding components are designated by the same reference characters, and description thereof will not be repeated.

FIG. 1 is an entire block diagram of a hybrid vehicle shown as an example of a vehicle according to the embodiment of the present invention. It is to be noted that the hybrid vehicle may be simply referred to as a "vehicle."

Referring to FIG. 1, a hybrid vehicle 10 includes an engine 100, an MG (Motor Generator) 110, an MG 120, a power split device 130, a reduction gear 140, a power storage device 150, a driving wheel 160, and an ECU (Electronic Control Unit) 170.

Engine 100, MG 110 and MG 120 are coupled to power split device 130. Hybrid vehicle 10 runs by a driving force from at least one of engine 100 and MG 120. The motive power generated by engine 100 is divided into two paths by power split device 130. In other words, one of the paths leads via reduction gear 140 to driving wheel 160 while the other of the paths leads to MG 110.

Engine 100 serves as an internal combustion engine generating motive power by combustion of fuel such as gasoline.

MG 110 is an alternating-current (AC) rotating electric machine, which is, for example, a three-phase AC synchronous motor provided with a U-phase coil, a V-phase coil and a W-phase coil. MG 110 generates electric power using the motive power of engine 100 split by power split device 130. For example, when the charging state (also referred to as an "SOC (State of Charge)") of power storage device 150 becomes lower than a predetermined value, engine 100 is started and MG 110 generates electric power. The electric power generated by MG 110 is converted from the alternating current into a direct current by an inverter (which will be described later). The direct-current (DC) power from the inverter has a voltage which is adjusted by a converter (which will be described later) and stored in power storage device 150.

MG 120 is an AC rotating electric machine, which is, for example, a three-phase AC synchronous motor provided with a U-phase coil, a V-phase coil and a W-phase coil. MG 120 generates driving force using at least one of the electric power stored in power storage device 150 and the electric power generated by MG 110. The driving force of MG 120 is then transmitted to driving wheel 160 via reduction gear 140. This allows MG 120 to assist engine 100 and allows the vehicle to run with the driving force from MG 120. Although driving wheel 160 is shown as a front wheel in FIG. 1, a rear wheel may be driven in place of the front wheel or together with the front wheel.

In addition, during braking and the like of the vehicle, MG 120 is driven by driving wheel 160 via reduction gear 140, to cause MG 120 to operate as a power generator. Thus, MG 120 is operated as a regenerative brake which converts the braking energy into electric power. The electric power generated by MG 120 is stored in power storage device 150.

Power split device 130 includes a planetary gear including a sun gear, a pinion gear, a carrier, and a ring gear. The pinion gear engages with the sun gear and the ring gear. The carrier supports the pinion gear in a rotatable manner and is coupled to the crankshaft of engine 100. The sun gear is coupled to the rotation shaft of MG 110. The ring gear is coupled to the rotation shaft of MG 120 and reduction gear 140.

Engine 100, MG 110 and MG 120 are coupled via power split device 130 consisting of a planetary gear, which establishes a relationship in which the rotation speeds of engine 100, MG 110 and MG 120 are connected with a straight line in a collinear diagram.

Power storage device 150 is a chargeable and dischargeable DC power supply which is, for example, a nickel-metal hydride or lithium-ion secondary battery. In addition to the electric power generated by MG 110 and MG 120, the electric power supplied from the power supply external to the vehicle is also stored in power storage device 150, as will be described later.

It is to be noted that a large capacity capacitor can also be employed as power storage device 150. Any type of power storage device 150 can be employed as long as the device serves as a power buffer which can temporarily store the electric power generated by MG 110 and MG 120 and the electric power from the power supply external to the vehicle, and can supply the stored electric power to MG 120. Furthermore, the number of power storage devices mounted in hybrid vehicle 10 is not particularly limited. Accordingly, a plurality of power storage devices may be mounted in hybrid vehicle 10. In addition, the capacity of each of the plurality of power storage devices may be substantially the same or may be different.

Engine 100, MG 110 and MG 120 are controlled by ECU 170. In addition, ECU 170 may be divided into a plurality of ECUs for each function.

Figure 2:
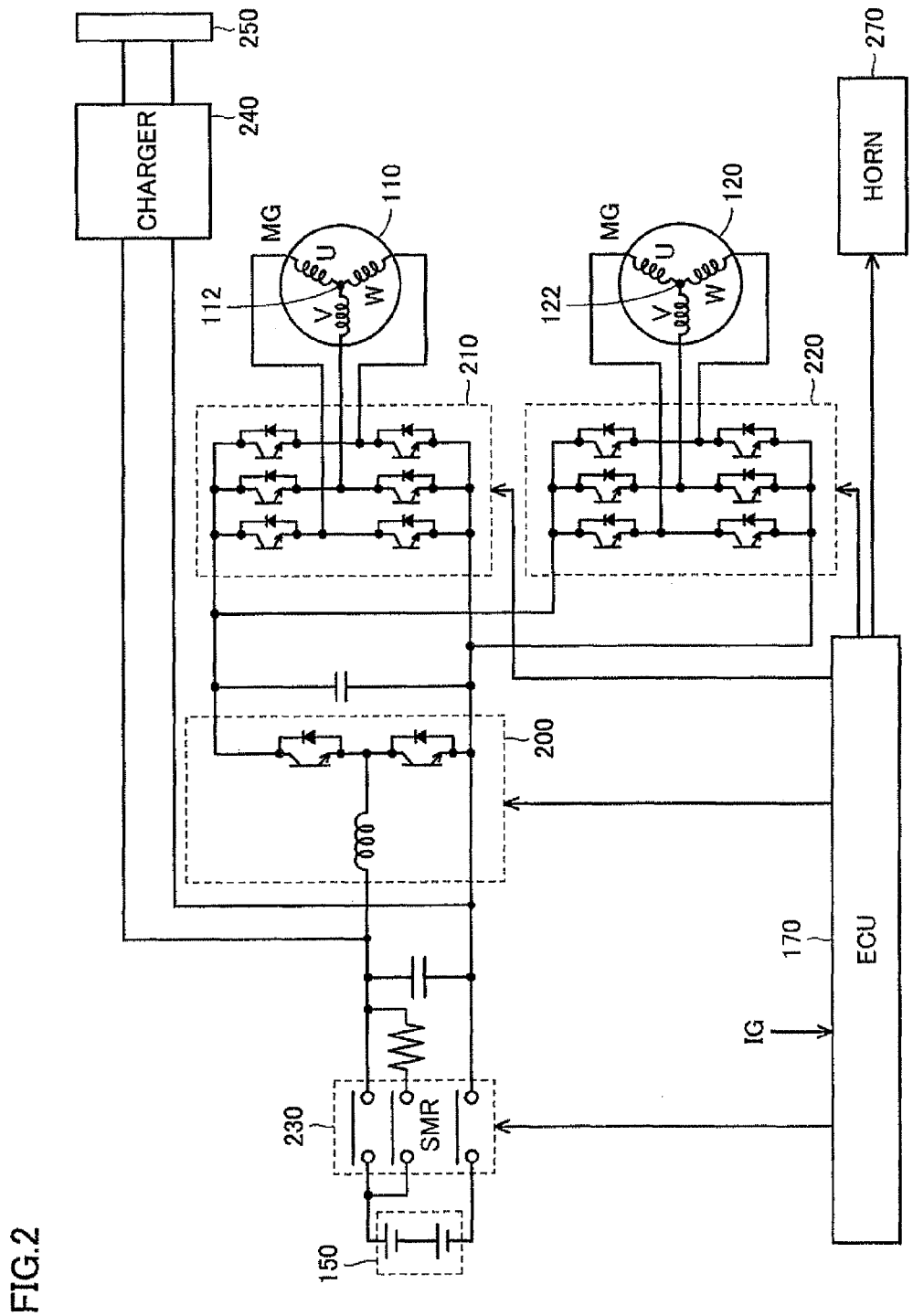
FIG. 2 is an entire configuration diagram of an electrical system of the hybrid vehicle according to the embodiment of the present invention.

FIG. 2 is an entire configuration diagram of an electrical system of the hybrid vehicle according to the embodiment of the present invention. Referring to FIG. 2, hybrid vehicle 10 includes a converter 200, an inverter 210, an inverter 220, an SMR (System Main Relay) 230, a charger 240, an inlet 250, and a horn 270.

Converter 200 includes a reactor, two npn-type transistors, and two diodes. The reactor has one end connected to power storage device 150 on the positive pole side thereof and the other end connected to the connection node between the two npn-type transistors. The two npn-type transistors are connected in series, in which a diode is connected in anti-parallel to each of the npn-type transistors.

In addition, for example, an IGBT (Insulated Gate Bipolar Transistor) can be used as an npn-type transistor. Furthermore, in place of an npn-type transistor, a power switching element such as a power MOSFET (Metal Oxide Semiconductor Field-Effect Transistor) may also be used.

When the electric power discharged from power storage device 150 is supplied to MG 110 or MG 120, converter 200 boosts the voltage from power storage device 150. In contrast, when power storage device 150 is charged with the electric power generated by MG 110 or MG 120, converter 200 lowers the voltage.

Inverters 210 and 220 each include a U-phase arm, a V-phase am and a W-phase arm. The U-phase arm, the V-phase arm and the W-phase arm are connected in parallel. Each of the U-phase arm, the V-phase arm and the W-phase arm has two npn-type transistors connected in series. A diode is connected between the collector and the emitter of each of the npn-type transistors, to cause a current to flow from the emitter side to the collector side.

The connection point between the two npn-type transistors in each arm of inverter 210 is connected to the end corresponding to each arm, which is different from a neutral point 112 of the stator coil of MG 110. The connection point between the two npn-type transistors in each arm of inverter 220 is connected to the end corresponding to each arm, which is different from a neutral point 122 of the stator coil of MG 120.

Inverter 210 converts the DC current supplied from power storage device 150 into an AC current and supplies the AC current to MG 110. Furthermore, inverter 210 converts the AC current generated by MG 110 into a DC current. Inverter 220 converts the DC current supplied from power storage device 150 into an AC current and supplies the AC current to MG 120. Furthermore, inverter 220 converts the AC current generated by MG 120 into a DC current.

Converter 200, inverter 210 and inverter 220 are controlled by ECU 170.

An SMR 230 is provided between power storage device 150 and charger 240. ECU 170 controls SMR 230 to switch between an opened state and a closed state. When SMR 230 is in the opened state, power storage device 150 is electrically interrupted from converter 200 and charger 240. When SMR 230 is in the closed state, power storage device 150 is electrically connected to converter 200 and charger 240.

Inlet 250 is provided in hybrid vehicle 10 for receiving the electric power supplied from the external power supply. Inlet 250 is configured such that it can be connected to a cable unit (not shown) for transmitting the electric power from the external power supply. As inlet 250 is connected via the cable unit to the external power supply, inlet 250 receives the electric power supplied from the external power supply.

Charger 240 is connected between power storage device 150 and converter 200. Charger 240 converts the AC power input to inlet 250 into a DC power and supplies the DC power to power storage device 150. When the DC power from charger 240 is supplied to power storage device 150, power storage device 150 is charged.

Horn 270 issues an alarm sound under control of ECU 170.

ECU 170 receives a signal IG for activating and deactivating the electrical system shown in FIG. 2. When signal IG is in an ON state, ECU 170 activates the electrical system. In contrast, when signal IG is in an OFF state, ECU 170 deactivates the electrical system. Signal IG is transmitted to ECU 170 from the switch (not shown) operated by the user. ECU 170 permits the operation of charger 240 when signal IG is in the OFF state.

Figure 3:
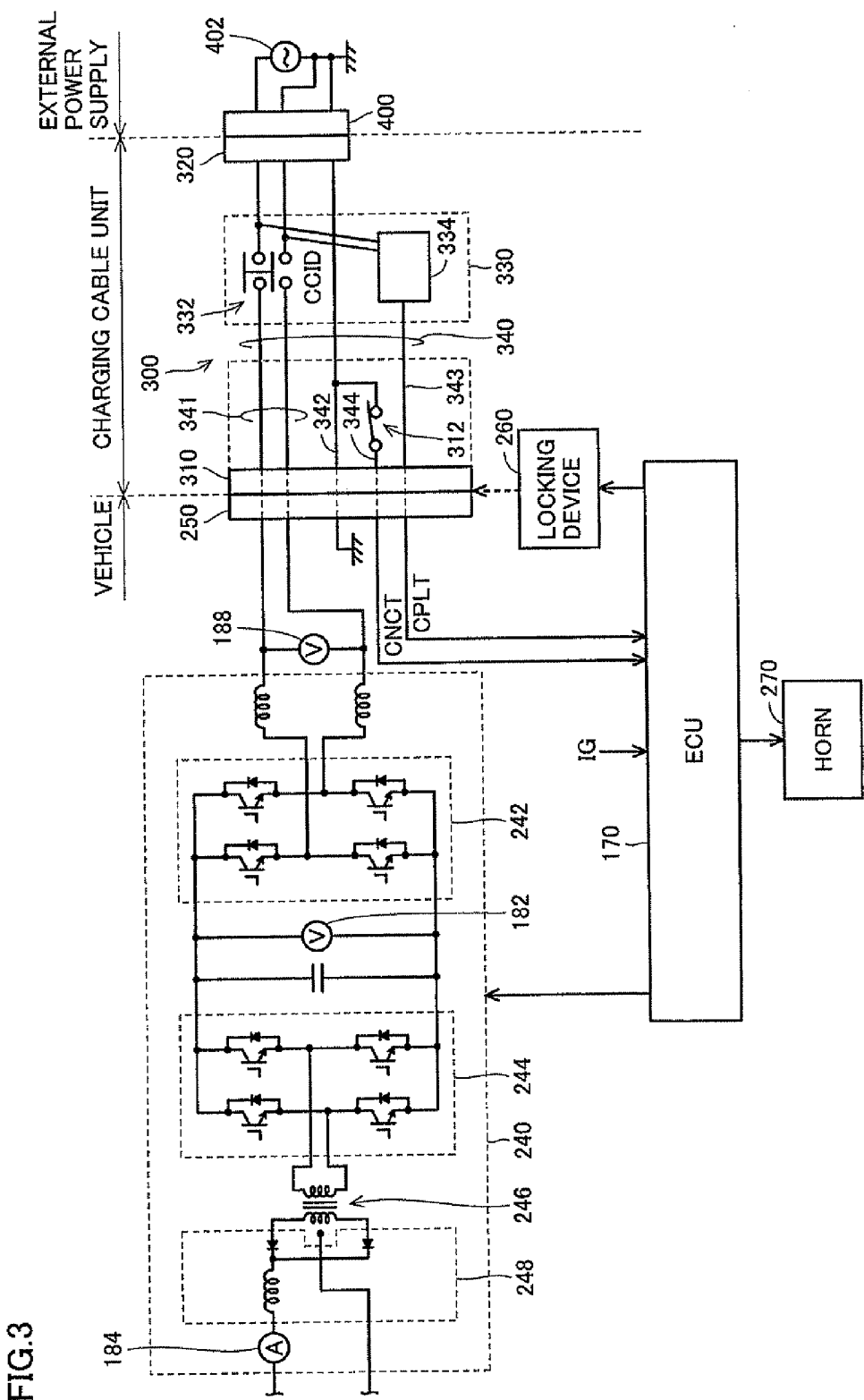
FIG. 3 is a diagram for illustrating the configuration for charging the hybrid vehicle according to the embodiment of the present invention by the external power supply.

FIG. 3 is a diagram for illustrating the configuration for charging the hybrid vehicle according to the embodiment of the present invention by the external power supply. Referring to FIG. 3, the charging system for charging power storage device 150 of hybrid vehicle 10 includes a charging cable unit 300, inlet 250, charger 240, ECU 170, a locking device 260, and horn 270.

Charger 240 includes an AC/DC conversion circuit 242, a DC/AC conversion circuit 244, an isolating transformer 246, and a rectifier circuit 248.

AC/DC conversion circuit 242 converts the AC power into a DC power based on the driving signal from ECU 170. Furthermore, AC/DC conversion circuit 242 also functions as a boost chopper circuit boosting a voltage by using a coil as a reactor. Based on the driving signal from ECU 170, DC/AC conversion circuit 244 converts the DC power into an AC power having a high frequency, and outputs the AC power to isolating transformer 246.

Isolating transformer 246 includes a core formed by a magnetic material, and a primary coil and a secondary coil wound around the core. The primary coil and the secondary coil are electrically insulated and connected to DC/AC conversion circuit 244 and rectifier circuit 248, respectively. Isolating transformer 246 converts the AC power of high frequency received from DC/AC conversion circuit 244 into a voltage level in accordance with the turns ratio of the primary coil and the secondary coil, to output the power to rectifier circuit 248. Rectifier circuit 248 rectifies the AC power output from isolating transformer 246 to a DC power.

The voltage between AC/DC conversion circuit 242 and DC/AC conversion circuit 244 (voltage across the terminals of a smoothing capacitor) is detected by a voltage sensor 182, and the signal showing the detection result is input into ECU 170. Furthermore, the output current of charger 240 is detected by a current sensor 184, and the signal showing the detection result is input into ECU 170.

In addition, ECU 170 may have not only the function of controlling charger 240 but also have a function of detecting a failure of charger 240. For example, in the case where the voltage detected by voltage sensor 182 and/or the current detected by current sensor 184 is greater than or equal to a threshold value, a failure of charger 240 is detected.

Charging cable unit 300 is for coupling hybrid vehicle 10 and power supply 402. Charging cable unit 300 includes a connector 310, a plug 320, a CCID (Charging Circuit Interrupt Device) 330, and a cable 340. Cable 340 includes a power line pair 341, a ground line 342, and signal lines 343, 344.

Connector 310 is connected to inlet 250 provided in hybrid vehicle 10. A switch 312 is provided in connector 310. When connector 310 is connected to inlet 250, switch 312 is brought into a closed state, and a signal CNCT indicating that connector 310 is connected to inlet 250 is input into ECU 170. In other words, switch 312 serves as a signal generator that generates signal CNCT.

Plug 320 is connected to a receptacle 400 to which an AC power is supplied from power supply 402. Receptacle 400 is provided, for example in a charging station.

CCID 330 including a relay 332 and a control pilot circuit 334 is inserted in the middle of cable 340 (power line pair 341). In the state where relay 332 is opened, the path is interrupted through which the electric power is supplied to hybrid vehicle 10 from power supply 402 external to hybrid vehicle 10. In the state where relay 332 is closed, the electric power can be supplied from power supply 402 to hybrid vehicle 10. Connector 310 is connected to inlet 250, which allows relay 332 to be controlled by ECU 170.

Control pilot circuit 334 operates with the electric power supplied from power supply 402 when plug 320 is connected to receptacle 400. Control pilot circuit 334 then generates a pilot signal CPLT. Pilot signal CPLT is transmitted through signal line 343 to ECU 170 of the vehicle.

Control pilot circuit 334 causes oscillation of pilot signal CPLT in a specified duty cycle (the ratio of the pulse width to the oscillation cycle). This duty cycle is set based on the rated current which can be supplied from power supply 402 through charging cable unit 300 to a vehicle. The rated current is set for each charging cable (power line pair). When a different type of charging cable is used, a rated current is also different. Thus, the duty cycle of pilot signal CPLT is also different. By detecting the duty cycle of pilot signal CPLT, ECU 170 can detect the rated current that can be supplied from power supply 402 via charging cable unit 300 to the vehicle.

The AC voltage of power supply 402 is detected by a voltage sensor 188 provided within hybrid vehicle 10. The detected voltage is transmitted to ECU 170.

Under control of ECU 170, locking device 260 locks connector 310 in the state where connector 310 is connected to inlet 250.

In the present embodiment, the electric power output from power supply 402 is supplied to power storage device 150 through charging cable unit 300, to thereby charge power storage device 150. During charging of power storage device 150, SMR 230 and relay 332 in CCID 330 are closed, and also, charger 240 is operated such that the electric power from power supply 402 is supplied to power storage device 150.

Figure 4:
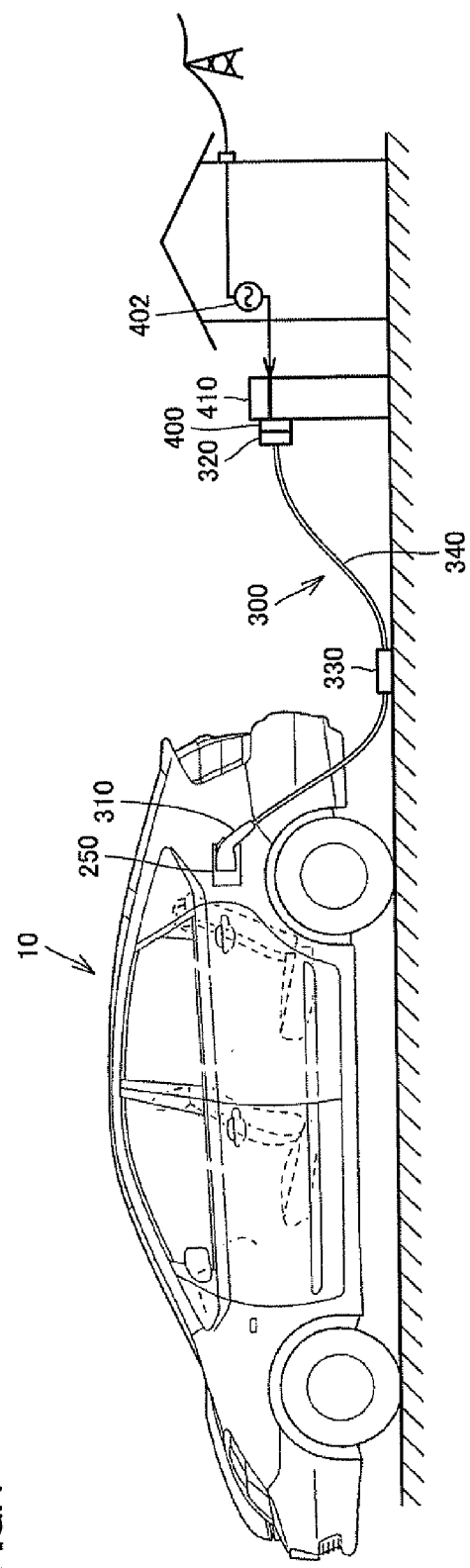
FIG. 4 is a diagram for illustrating an example of the external power supply capable of supplying electric power to the hybrid vehicle.

FIG. 4 is a diagram for illustrating an example of the external power supply capable of supplying the electric power to the hybrid vehicle. Referring to FIG. 4, charging station 410 is a facility for supplying electric power to hybrid vehicle 10. For example, charging station 410 is installed in proximity to the parking space of hybrid vehicle 10.

Charging station 410 is provided with receptacle 400. Receptacle 400 is connected to power supply 402. Power supply 402 typically supplies the electric power from a system power supply. It is to be noted that power supply 402 may supply the electric power generated by the power generation equipment (for example, a solar battery panel and the like). Power supply 402 may supply the electric power output from the power storage device storing the electric power generated by the power generation equipment.

Connector 310 provided at one end of cable 340 is connected to inlet 250 provided in hybrid vehicle 10. Plug 320 provided at the other end of cable 340 is connected to receptacle 400 provided in charging station 410.

Figure 5:
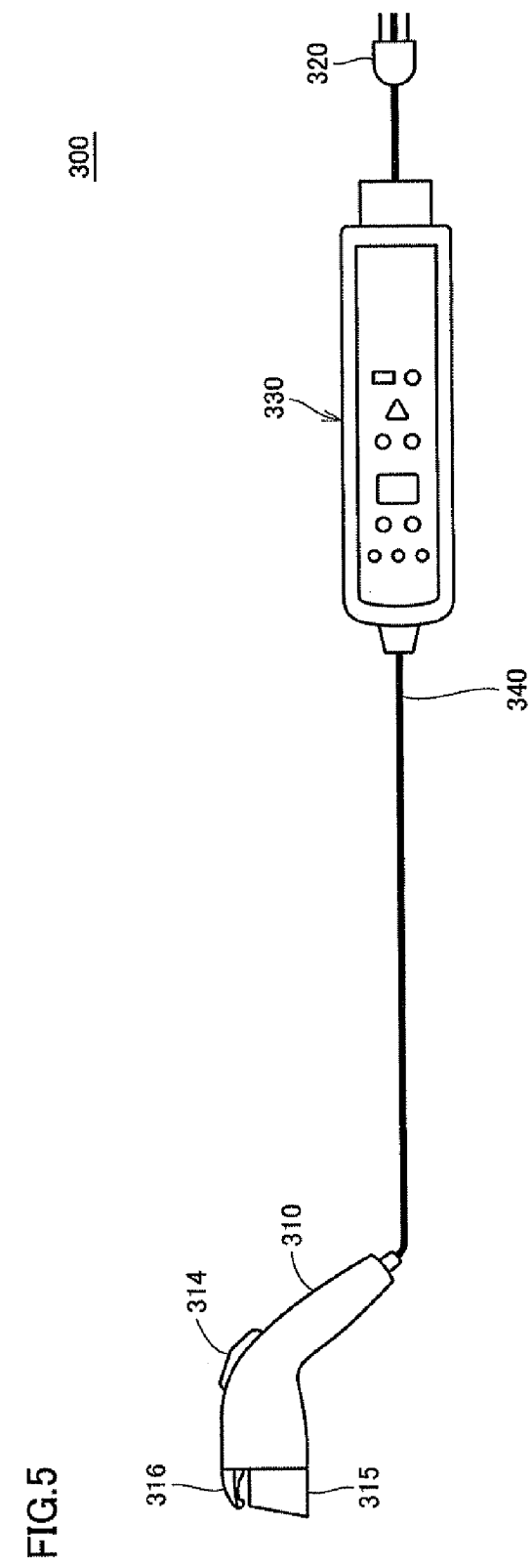
FIG. 5 is a schematic diagram of a charging cable unit.

FIG. 5 is a schematic diagram of a charging cable unit. Referring to FIG. 5, charging cable unit 300 includes connector 310, plug 320, CCID 330, and cable 340. Connector 310 includes a release button 314, an attachment portion 315 attached to inlet 250 of the vehicle, and an engagement unit 316.

Attachment portion 315 has a plurality of terminals (not shown). When attachment portion 315 is inserted into inlet 250 of hybrid vehicle 10, the power line pair and the signal line of the charging cable unit are connected to the vehicle. Engagement unit 316 serves to fix connector 310 in the state where connector 310 is connected to inlet 250 of the vehicle. Engagement unit 316 moves in response to the operation of release button 314.

Figure 6:
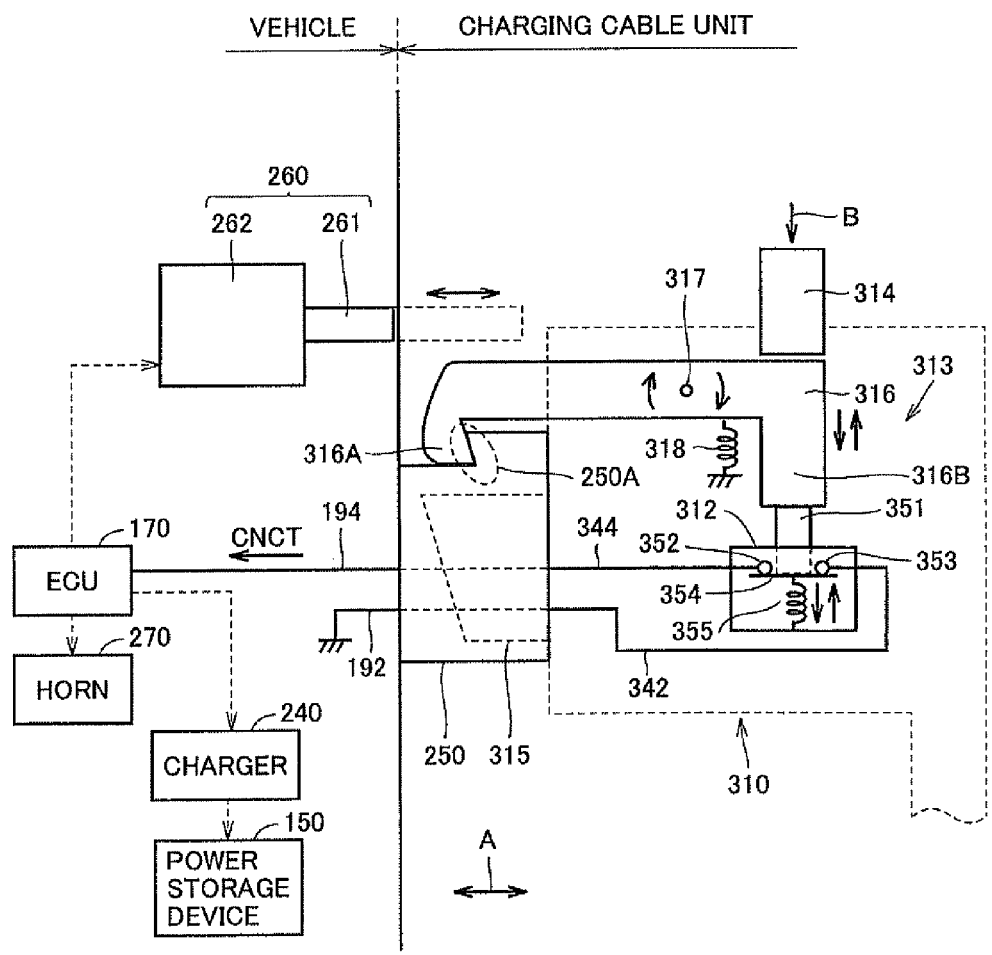
FIG. 6 is a configuration diagram for illustrating the configuration regarding connection between the connector of the charging cable unit and the inlet of the vehicle.

FIG. 6 is a configuration diagram for illustrating the configuration regarding the connection between the connector of the charging cable unit and the inlet of the vehicle. Referring to FIG. 6, connector 310 includes attachment portion 315, a latch mechanism 313, release button 314, switch 312, ground line 342, and signal line 344.

For the sake of explanation, FIG. 6 does not show power line pair 341. For the same reason, power line pair 341 is not shown in FIGS. 7 to 10, which will be described later.

Latch mechanism 313 includes engagement unit 316, a rotation shaft 317 attached to engagement unit 316, and a spring 318 attached to engagement unit 316. A stepped portion 250A is provided in inlet 250. Engagement unit 316 includes a front end portion 316A formed in the shape of a hook, and a rear end portion 316B. Rotation shaft 317 extends in the direction orthogonal to the direction in which attachment portion 315 is attached to and detached from inlet 250 (the direction shown by an arrow A in the figure).

Switch 312 includes a button 351, a terminal 352 connected to signal line 344, a terminal 353 connected to ground line 342, a movable piece 354 for connecting terminals 352 and 353, and a spring 355 for moving movable piece 354.

In the case where connector 310 is connected to inlet 250 of the vehicle, attachment portion 315 is inserted into inlet 250. Furthermore, front end portion 316A of engagement unit 316 engages with stepped portion 250A provided in inlet 250. This allows connector 310 to be locked in the state where connector 310 is connected to inlet 250. When the operation of pressing release button 314 in the direction of an arrow B is carried out, front end portion 316A of engagement unit 316 is separated from inlet 250. This causes engagement unit 316 to be disengaged from inlet 250.

Button 351 of switch 312 is pressed by rear end portion 316B of engagement unit 316. Switch 312 is brought into an opened state when button 351 is pressed while switch 312 is brought into a closed state when button 351 is not pressed. When button 351 is not pressed, movable piece 354 is brought by spring 355 into contact with terminals 352 and 353. Consequently, switch 312 is brought into a closed state. In contrast, when button 351 is pressed, movable piece 354 is separated by button 351 from terminals 352 and 353. Consequently, switch 312 is brought into an opened state.

The vehicle includes locking device 260 which is operated under control of ECU 170. Locking device 260 includes a bar 261 and a main body 262 for moving bar 261. During the operation of locking device 260, main body 262 causes bar 261 to protrude to the outside of the vehicle. Locking device 260 also release locking under control of ECU 170. In this case, main body 262 causes bar 261 to be housed within the vehicle. The direction in which bar 261 moves is identical to the direction in which attachment portion 315 is attached to and detached from inlet 250 (that is, the direction along arrow A shown in the figure).

Furthermore, the vehicle includes a ground line 192 connected to ground line 342 of connector 310 and a signal line 194 connected to signal line 344 of connector 310. Signal line 194 is connected to signal line 344, which allows transmission of signal CNCT from connector 310 to ECU 170.

Figure 7:
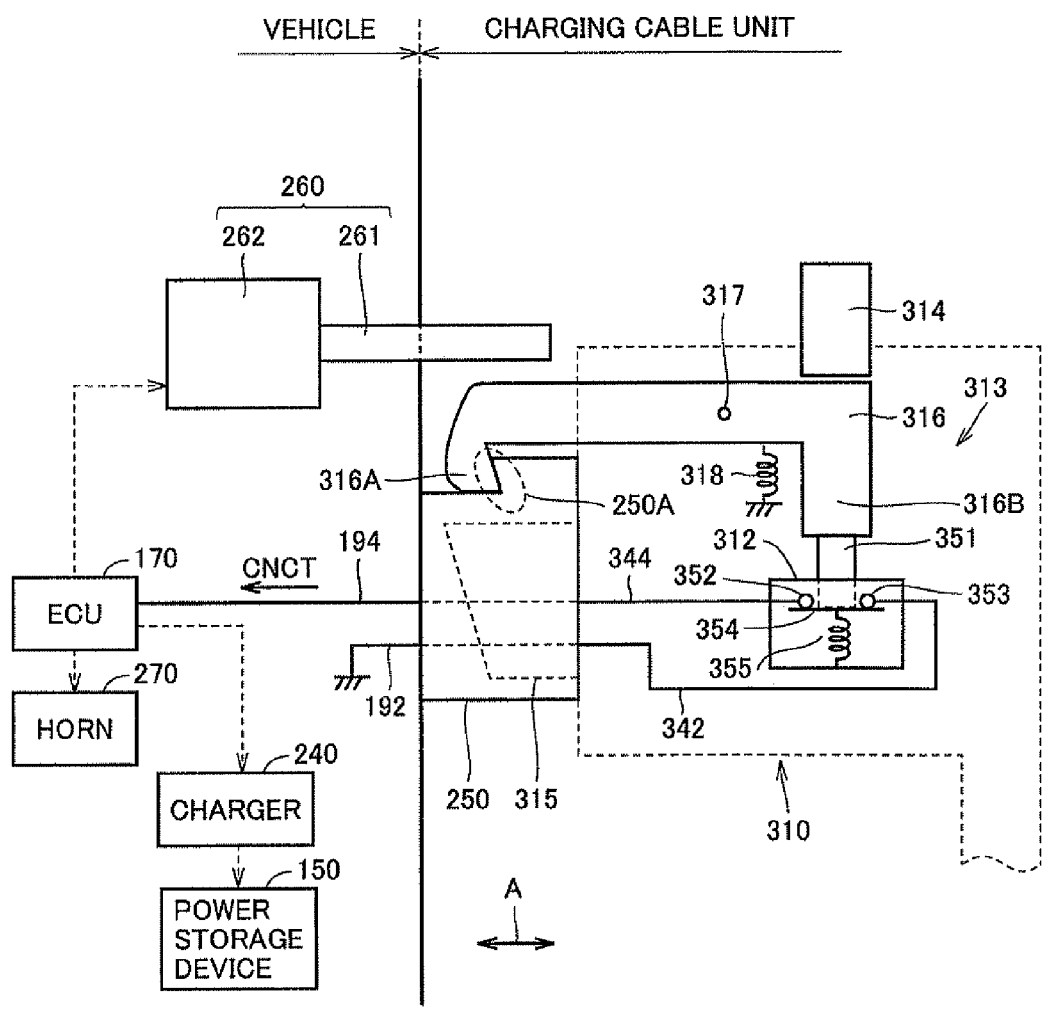
FIG. 7 is a diagram for illustrating connection between the connector of the charging cable unit and the inlet of the vehicle during charging of the power storage device mounted in the vehicle.

FIG. 7 is a diagram for illustrating the connection between the connector of the charging cable unit and the inlet of the vehicle during charging of the power storage device mounted in the vehicle.

Referring to FIG. 7, connector 310 and inlet 250 of the vehicle are connected to each other, so that ground line 342 of connector 310 is connected to ground line 192 of the vehicle while signal line 344 of connector 310 is connected to signal line 194 of the vehicle.

Furthermore, since button 351 of switch 312 is not pressed, switch 312 is in a closed state. Signal line 344 is connected to ground line 342 by switch 312. This allows transmission of signal CNCT from connector 310 to ECU 170. Signal CNCT has a ground voltage.

When signal CNCT is input into ECU 170, ECU 170 causes locking device 260 to be activated. Under control of ECU 170, locking device 260 causes bar 261 to protrude to the outside of the vehicle.

When release button 314 is pressed, engagement unit 316 rotates about rotation shaft 317 in the direction away from inlet 250. However, bar 261 restricts the movement of engagement unit 316. This allows engagement unit 316 to be maintained in the state where engagement unit 316 engages with inlet 250.

Figure 8:
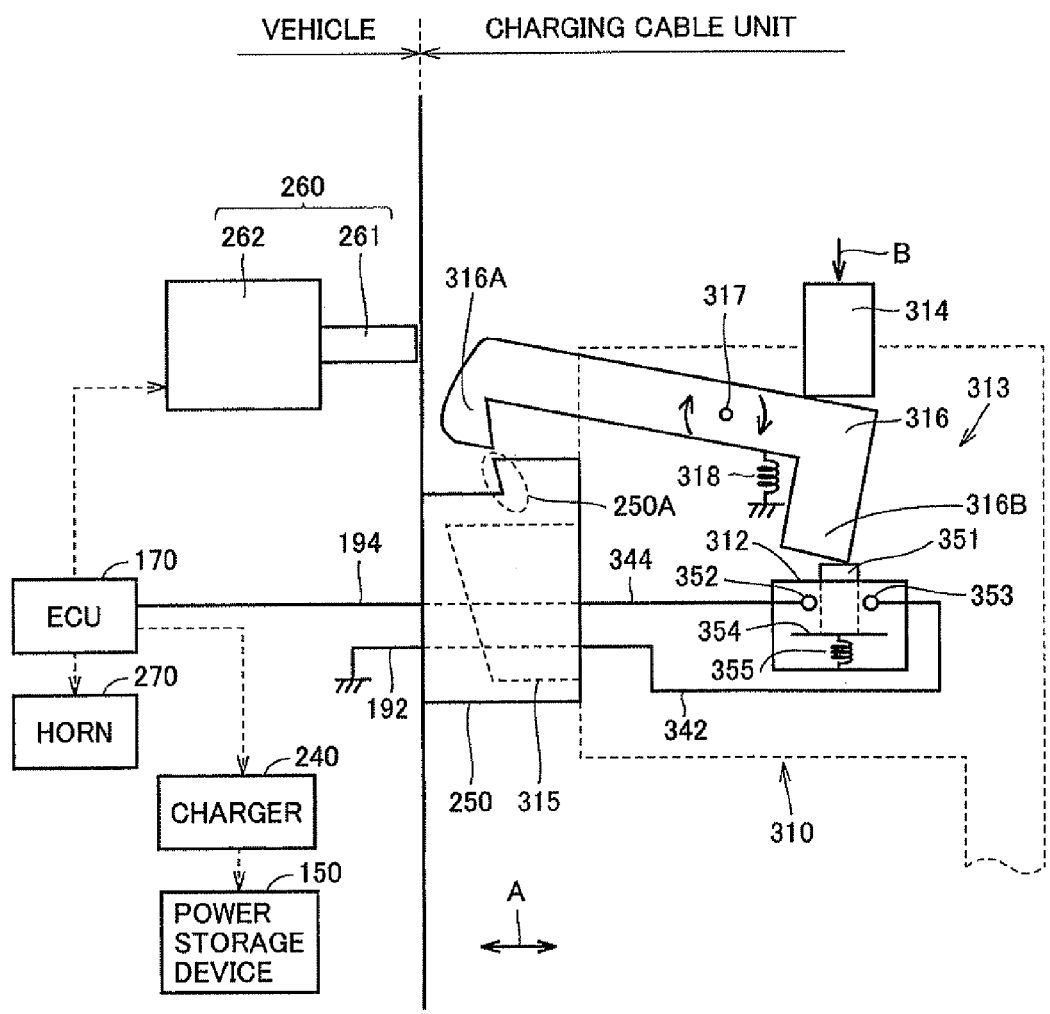
FIG. 8 is a diagram for illustrating the state where the connector of the charging cable unit can be detached from the inlet of the vehicle.

FIG. 8 is a diagram for illustrating the state where the connector of the charging cable unit can be detached from the inlet of the vehicle.

Referring to FIG. 8, locking device 260 releases locking under control of ECU 170. Specifically, locking device 260 causes bar 261 to be housed within the vehicle. When release button 314 is pressed, engagement unit 316 rotates about rotation shaft 317 in the direction away from inlet 250. In this case, release button 314 is pressed to thereby allow engagement unit 316 to be disengaged from inlet 250. Consequently, the user can remove connector 310 from inlet 250.

In addition, button 351 of switch 312 is pressed by rear end portion 316B of engagement unit 316. Button 351 of switch 312 is pressed, so that movable piece 354 is separated from terminals 352 and 353. This causes connector 310 to stop providing an output of signal CNCT to ECU 170.

Figure 9:
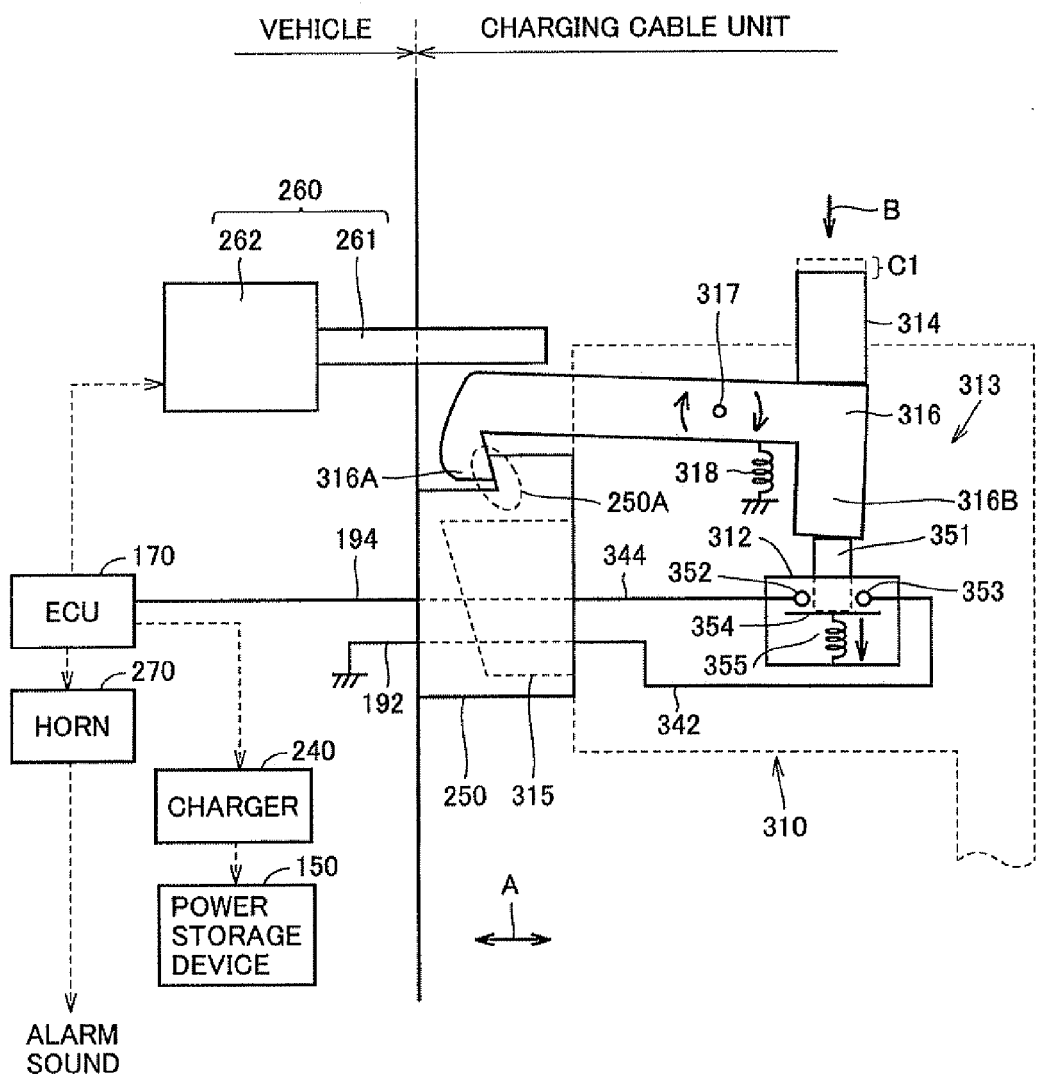
FIG. 9 is the first diagram for illustrating the operation of the charging system in the case where a release button is operated during the operation of the locking device.
Figure 10:
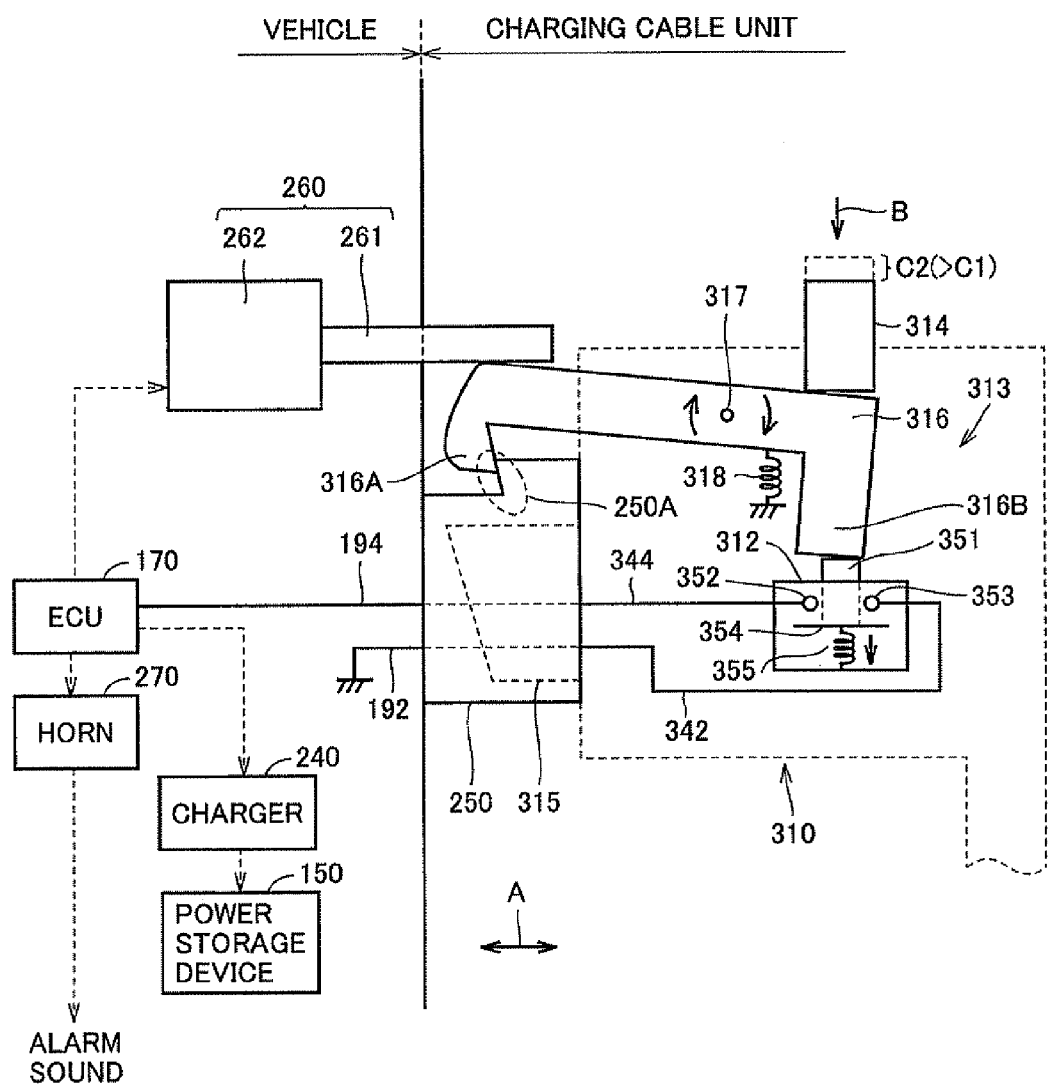
FIG. 10 is the second diagram for illustrating the operation of the charging system in the case where the release button is operated during the operation of the locking device.

FIG. 9 is the first diagram for illustrating the operation of the charging system in the case where the release button is operated during the operation of the locking device. FIG. 10 is the second diagram for illustrating the operation of the charging system in the case where the release button is operated during the operation of the locking device.

Referring to FIGS. 9 and 10, when release button 314 is operated during the operation of locking device 260, engagement unit 316 rotates about rotation shaft 317.

In the case where the operation amount of release button 314 (movement amount of release button 314 in the direction shown by arrow B) is C1, button 351 of switch 312 is pressed by rear end portion 316B of engagement unit 316, so that movable piece 354 is separated from terminals 352 and 353. This causes connector 310 to stop transmitting signal CNCT to ECU 170.

ECU 170 causes horn 270 to operate in response to the fact that generation of signal CNCT is stopped. Horn 270 issues an alarm sound for causing people around the vehicle to pay attention to the vehicle.

In addition, in the stage where transmission of signal CNCT is stopped, engagement unit 316 is not in contact with bar 261. As shown in FIG. 10, in the case where the operation amount of release button 314 is C2 which is greater than C1, engagement unit 316 is brought into contact with bar 261. Since bar 261 restricts the movement of engagement unit 316, engagement unit 316 cannot be disengaged from inlet 250. Therefore, the connection between connector 310 and inlet 250 is locked.

Furthermore, since generation of signal CNCT is stopped, ECU 170 causes horn 270 to operate. Horn 270 then issues an alarm sound.

As described above, ECU 170 controls charging of power storage device 150 and also detects whether signal CNCT is issued or not. When ECU 170 detects that switch 312 stopped generation of signal CNCT during charging of power storage device 150, ECU 170 causes horn 270 to issue an alarm.

Figure 11:
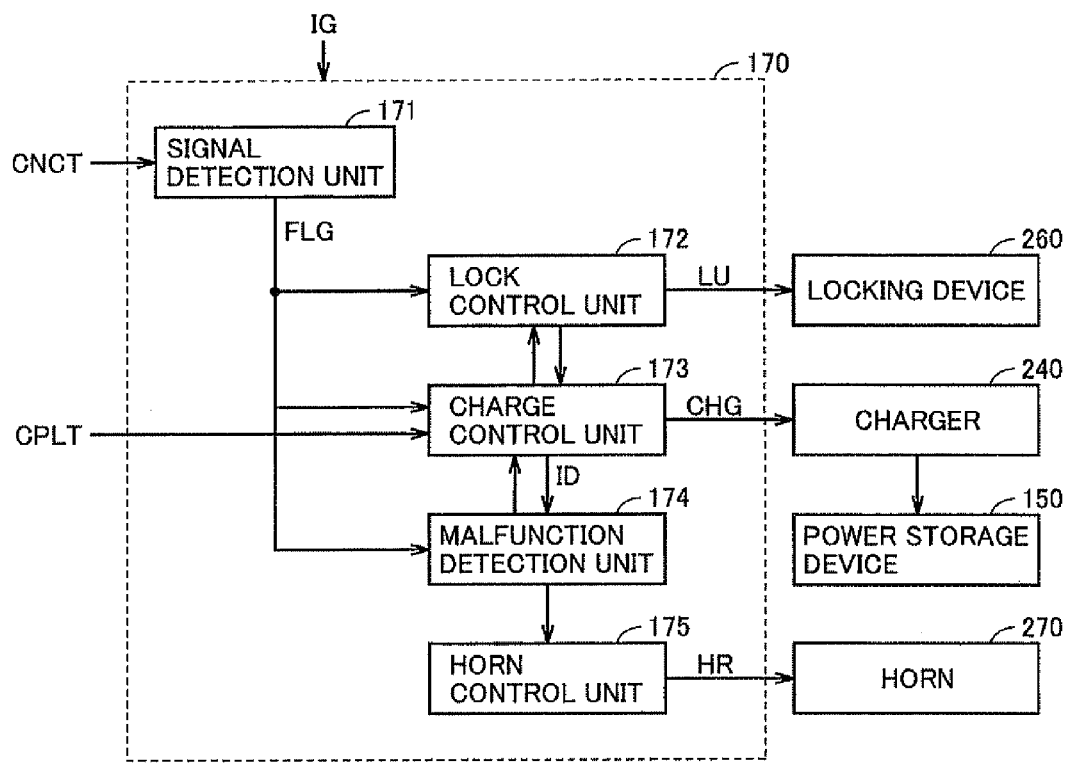
FIG. 11 is a functional block diagram of an ECU.

FIG. 11 is a functional block diagram of an ECU. FIG. 11 particularly shows the configuration regarding control of charging of the power storage device. Referring to FIG. 11, ECU 170 includes a signal detection unit 171, a lock control unit 172, a charge control unit 173, a malfunction detection unit 174, and a horn control unit 175.

Signal detection unit 171 receives signal CNCT generated by connector 310 to thereby detect whether or not connector 310 issued signal CNCT. Signal detection unit 171 outputs a flag FLG showing the detection result. When receiving signal CNCT, signal detection unit 171 sets the value of flag FLG at "1". When signal detection unit 171 does not receive signal CNCT, it sets the value of flag FLG at "0".

Lock control unit 172 receives flag FLG from signal detection unit 171. When flag FLG changes from "0" to "1", lock control unit 172 outputs a signal LU to locking device 260. In this case, in response to signal LU, locking device 260 causes bar 261 to protrude to the outside of the vehicle. Lock control unit 172 outputs the signal to charge control unit 173 indicating that locking device 260 is activated.

Furthermore, lock control unit 172 receives an instruction from charge control unit 173 to release locking. In this case, lock control unit 172 outputs signal LU for releasing locking to locking device 260. In response to signal LU, locking device 260 causes bar 261 to be housed within the vehicle.

Charge control unit 173 receives flag FLG from signal detection unit 171, receives signal CPLT from connector 310, and receives the signal from lock control unit 172 indicating that locking device 260 is activated. In this way, charge control unit 173 determines that connection between connector 310 and inlet 250 has been established, and then, generates a control signal CHG for controlling charger 240. The generated control signal CHG is transmitted from charge control unit 173 to charger 240. In response to control signal CHG, charger 240 charges power storage device 150.

In addition, charge control unit 173 acquires the information regarding the SOC of power storage device 150, to thereby determine whether charging of power storage device 150 is to be terminated or not. When the SOC of power storage device 150 reaches a prescribed state (for example, a fully charged state), charge control unit 173 deactivates charger 240, to thereby terminate charging of power storage device 150. Furthermore, charge control unit 173 outputs an instruction for releasing locking to lock control unit 172.

Charge control unit 173 outputs a variable ID to malfunction detection unit 174 which shows whether or not power storage device 150 is being charged. For example, variable ID is set at "1" when power storage device 150 is being charged. In contrast, variable ID is set at "0" when power storage device 150 is not being charged.

Malfunction detection unit 174 receives flag FLG from signal detection unit 171 and also receives variable ID from charge control unit 173. When variable ID is "1", malfunction detection unit 174 detects that power storage device 150 is being charged. Furthermore, when flag FLG is "0" in spite of the fact that power storage device 150 is being charged, malfunction detection unit 174 detects a malfunction. Malfunction detection unit 174 transmits the detection result to charge control unit 173 and horn control unit 175. A "malfunction" used herein means that release button 314 is operated during charging of power storage device 150.

Charge control unit 173 receives the detection result of malfunction detection unit 174 to thereby stop the operation of charger 240. Horn control unit 175 receives the detection result of malfunction detection unit 174 to thereby generate a driving signal HR for causing horn 270 to operate, and also outputs the generated driving signal HR to horn 270. In response to driving signal HR, horn 270 issues an alarm sound.

In addition, ECU 170 receives signal IG for activating and deactivating the electrical system shown in FIG. 2.

Figure 12:
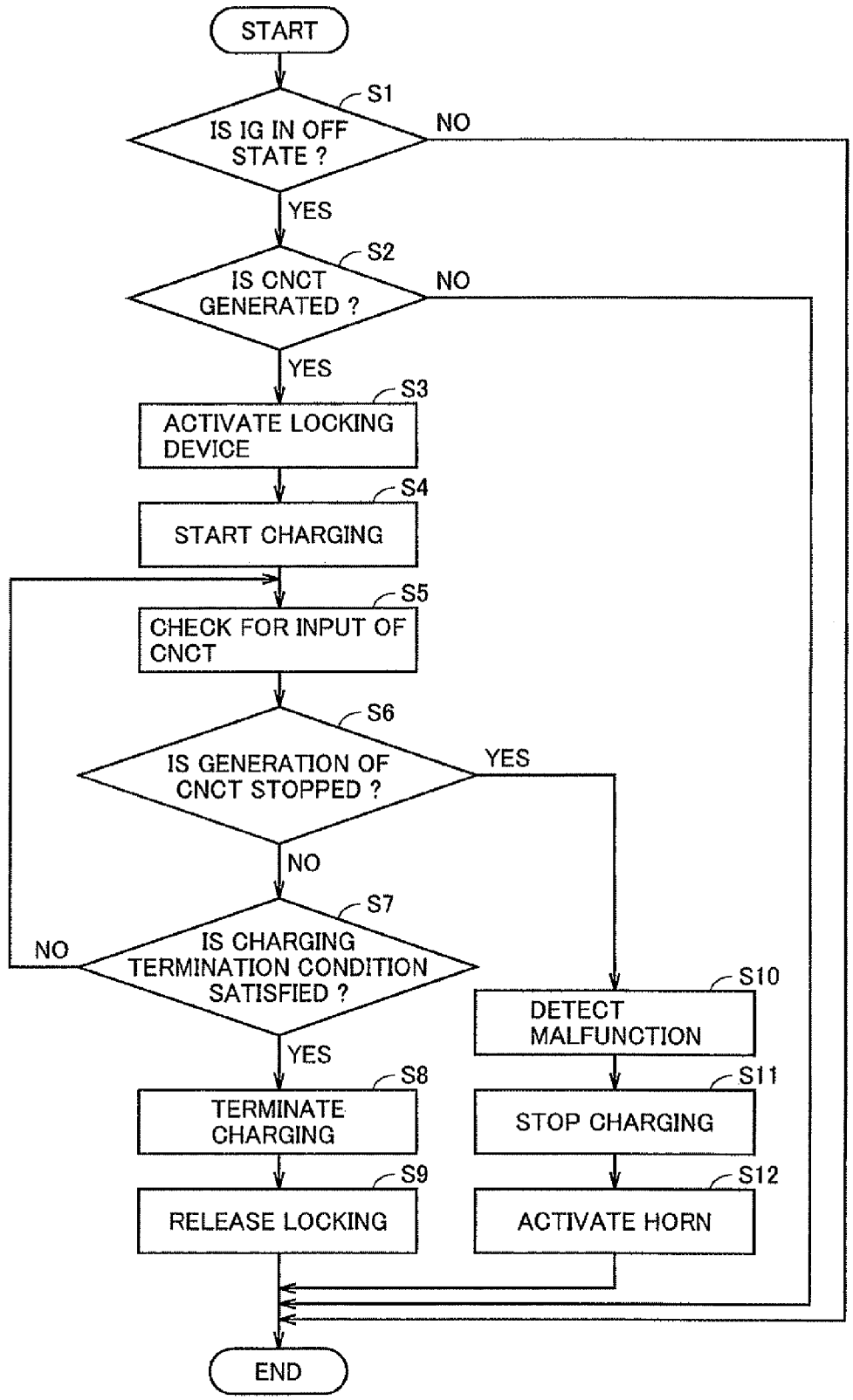
FIG. 12 is a flowchart illustrating the charging process of the power storage device performed by the ECU.

FIG. 12 is a flowchart illustrating the charging process of the power storage device performed by the ECU. Referring to FIGS. 11 and 12, when the process is started, ECU 170 determines whether or not signal IG is in an OFF state (step S1). This process is performed, for example, by charge control unit 173. When it is determined that signal IG is not in the OFF state (NO in step S1), the entire process is ended. In contrast, when it is determined that signal IG is in the OFF state, (YES in step S1), the process proceeds to step S2.

In step S2, ECU 170 determines (detects) whether signal CNCT is generated or not. This process is performed by signal detection unit 171. When signal detection unit 171 does not detect signal CNCT (NO in step S2), signal detection unit 171 sets flag FLG at "0". Furthermore, the entire process is ended.

In contrast, when signal detection unit 171 detects signal CNCT (YES in step S2), signal detection unit 171 sets flag FLG at "1". Furthermore, the process proceeds to step S3.

In step S3, lock control unit 172 transmits signal LU to locking device 260 to cause locking device 260 to be activated. In response to signal LU, locking device 260 causes bar 261 to protrude to the outside of the vehicle. Furthermore, lock control unit 172 outputs the signal indicating that locking device 260 is activated, to charge control unit 173.

In step S4, charge control unit 173 generates control signal CHG for controlling charger 240 based on flag FLG from signal detection unit 171, signal CPLT from connector 310 and the signal from lock control unit 172. In response to control signal CHG, charger 240 starts charging of power storage device 150.

In step S5, ECU 170 checks for input of signal CNCT. In step S6, ECU 170 determines (detects) whether generation of signal CNCT is stopped or not. The process of steps S5 and S6 is performed by signal detection unit 171. In the case where signal detection unit 171 detects signal CNCT (NO in step S6), signal detection unit 171 maintains flag FLG at "1". In this case, the process proceeds to step S7.

In step S7, charge control unit 173 determines whether the condition for terminating charging of power storage device 150 (charging termination condition) is satisfied or not. When the SOC of power storage device 150 reaches a prescribed state (for example, the fully charged state), charge control unit 173 determines that the charging termination condition is satisfied. In this case (YES in step S7), the process proceed to step S8. In the case where the SOC of power storage device 150 does not yet reach a prescribed state, charge control unit 173 determines that the charging termination condition is not satisfied. In this case (NO in step S7), the process is returned to step S5. In other words, the process of steps S5 to S7 is repeated until the charging termination condition is satisfied.

In step S8, charge control unit 173 deactivates charger 240 to thereby terminate charging of power storage device 150. In step S9, charge control unit 173 outputs an instruction for releasing locking to lock control unit 172. In response to this instruction, lock control unit 172 outputs signal LU to locking device 260. In response to signal LU, locking device 260 causes bar 261 to be housed within the vehicle, so that locking is released. When the process of step S9 is completed, the entire process ends.

In step S6, when signal detection unit 171 does not detect signal CNCT (YES in step S6), signal detection unit 171 changes flag FLG from "1" to "0". Furthermore, the process proceeds to step S10. In step S10, malfunction detection unit 174 receives flag FLG from signal detection unit 171 and also receives variable ID from charge control unit 173. When variable ID is "1", malfunction detection unit 174 detects that power storage device 150 is being charged. Then, when flag FLG is "0" in spite of the fact that power storage device 150 is being charged, malfunction detection unit 174 detects a malfunction.

In step S11, charge control unit 173 deactivates charger 240 in accordance with the detection results of malfunction detection unit 174. This leads to termination of charging of power storage device 150. In step S12, horn control unit 175 activates horn 270 in accordance with the detection results of malfunction detection unit 174. When the process in step S12 is completed, the entire process ends.

As described above, according to the embodiment of the present invention, connector 310 of the charging cable unit includes latch mechanism 313 configured to lock connector 310 in the state where connector 310 is connected to inlet 250, release button 314 for releasing locking by latch mechanism 313, and switch 312. Switch 312 causes generation of signal CNCT indicating that connector 310 is connected to inlet 250. Furthermore, in response to the operation of release button 314, switch 312 stops generation of signal CNCT. Horn 270 issues an alarm when ECU 170 (signal detection unit 171) detects that generation of signal CNCT by switch 312 is stopped during charging of power storage device 150 by charger 240.

In the case where release button 314 is operated in order to remove charging cable unit 300 from inlet 250 of hybrid vehicle 10 during charging of power storage device 150, generation of signal CNCT is stopped. In this case, an alarm sound is issued from horn 270 provided in hybrid vehicle 10. This alarm sound can allow the people around the vehicle to pay attention to the vehicle, which can reduce the possibility that the charging cable unit may be removed from the inlet of the vehicle.

Furthermore, according to the embodiment of the present invention, latch mechanism 313 includes engagement unit 316 engaging with inlet 250 for locking the connection between connector 310 and inlet 250. The charging system further includes locking device 260 for locking engagement unit 316 in the state where engagement unit 316 engages with inlet 250. When signal CNCT is detected, ECU 170 (lock control unit 172) activates locking device 260.

Locking device 260 can reliably prevent engagement unit 316 from being removed from inlet 250, which can further reduce the possibility that the charging cable unit may be removed from the inlet of the vehicle.

Furthermore, according to the embodiment of the present invention, locking device 260 includes bar 261. When release button 314 is operated to cause engagement unit 316 of latch mechanism 313 to be moved in the direction away from inlet 250, bar 261 is brought into contact with engagement unit 316 to thereby restrain the movement of engagement unit 316. The operation amount (C2) of release button 314 for bringing engagement unit 316 into contact with bar 261 is greater than the operation amount (C1) of release button 314 for stopping generation of signal CNCT by switch 312.

In the case where operation amount C2 of release button 314 is smaller than operation amount C1 of release button 314, signal CNCT is continuously generated even if engagement unit 316 of latch mechanism 313 is brought into contact with the bar of locking device 260. Therefore, horn 270 does not issue an alarm sound. In the embodiment of the present invention, when release button 314 is operated, generation of signal CNCT is first stopped, and then, engagement unit 316 is brought into contact with bar 261. In the case where release button 314 is operated during charging of the power storage device, horn 270 issues an alarm sound in the state where connector 310 is prevented from being removed from inlet 250. This can further reduce the possibility that the charging cable unit may be removed from the inlet of the vehicle.

Furthermore, according to the embodiment of the present invention, when ECU 170 completes charging of power storage device 150 by charger 240, locking by locking device 260 is released. Accordingly, the charging cable unit can be prevented from being removed from the inlet of the vehicle during charging of power storage device 150.

Furthermore, according to the embodiment of the present invention, the signal generator generating signal CNCT is configured as a switch, which allows simplification of the configuration of the signal generator.

Thus, according to the embodiment of the present invention, the possibility can be reduced that the charging cable unit may be removed from the inlet of the vehicle. Consequently, the charging cable unit can be prevented from being stolen.

It is to be noted that the signal generator (a switch in the embodiment of the present invention) is not limited to be disposed in the connector of the charging cable unit, but may be disposed in the vehicle. Similarly, locking device 260 is not limited to be disposed in the vehicle, but may be disposed in the connector of the charging cable unit.

Furthermore, the present invention can be applied to a vehicle equipped with a power storage device. In the above-described embodiments, an explanation has been made with regard to the hybrid vehicle equipped with an internal combustion engine, an electric motor and a power storage device, as an example of the vehicle equipped with an electric motor generating a driving force for running and a power storage device storing the electric power supplied to the electric motor. It is to be noted that the present invention can also be applied, for example, to an electric vehicle, a fuel-cell vehicle or the like.

It should be understood that the embodiments disclosed herein are illustrative and non-restrictive in every respect. The scope of the present invention is defined by the terms of the claims, rather than the description of the embodiments provided above, and is intended to include any modifications within the scope and meaning equivalent to the terms of the claims.

REFERENCE SIGNS LIST 10 hybrid vehicle, 100 engine, 112, 122 neutral point, 130 power split device, 140 reduction gear, 150 power storage device, 160 driving wheel, 171 signal detection unit, 172 lock control unit, 173 charge control unit, 174 malfunction detection unit, 175 horn control unit, 182, 188 voltage sensor, 184 current sensor, 192, 342 ground line, 194, 343, 344 signal line, 200 converter, 210, 220 inverter, 240 charger, 242 AC/DC conversion circuit, 244 DC/AC conversion circuit, 246 isolating transformer, 248 rectifier circuit, 250 inlet, 250 inlet, 250A stepped portion, 260 locking device, 261 bar, 262 main body, 270 horn, 300 charging cable unit, 310 connector, 312 switch, 313 latch mechanism, 314 release button, 315 attachment portion, 316 engagement unit, 316A front end portion, 316B rear end portion, 317 rotation shaft, 318, 355 spring, 320 plug, 332 relay, 334 control pilot circuit, 340 cable, 340A, 340B cable, 341 power line pair, 351 button, 352, 353 terminal, 354 movable piece, 400 receptacle, 402 power supply, 410 charging station, A, B arrow.

The invention claimed is:

1. A charging system for charging a power storage device mounted in a vehicle by a power supply external to said vehicle, said charging system comprising:
   an inlet provided in said vehicle for receiving electric power from said power supply, said inlet including a stepped portion;
   a cable including an electric power line for transmitting the electric power from said power supply to said vehicle;
   a connector provided at an end of said cable and being attachable to and detachable from said inlet;
   a first locking device including an engagement unit engaging with said stepped portion for locking said connector in a state where said connector is connected to said inlet;
   a release button for releasing locking by said first locking device;
   a signal generator configured to generate a signal indicating that said connector is connected to said inlet and to stop generation of said signal in response to an operation of said release button;
   a charger configured to charge said power storage device with the electric power input into said inlet;
   a charge control unit configured to control charging of said power storage device by said charger;
   a signal detection unit configured to detect said signal generated by said signal generator;
   an alarm issuing unit configured to issue an alarm when said signal detection unit detects that said signal generator stopped generation of said signal during charging of said power storage device by said charger;
   a second locking device configured to lock said engagement unit in a state where said engagement unit engages with said stepped portion; and
   a lock control unit configured to activate said second locking device when said signal detection unit detects said signal,
   said second locking device including a movement restraining member restraining movement of said engagement unit by coming into contact with said engagement unit when the operation of said release button causes said engagement unit to move in a direction away from said stepped portion, and
   an operation amount of said release button for bringing said engagement unit into contact with said movement restraining member being greater than the operation amount of said release button for stopping generation of said signal by said signal generator.

2. The charging system according to claim 1, wherein said lock control unit is configured to release locking by said second locking device when said charge control unit terminates charging of said power storage device by said charger.

3. The charging system according to claim 1, wherein
   said signal has a prescribed voltage, and
   said signal generator includes a switch configured to connect a signal line for transmitting said signal and a voltage line receiving said prescribed voltage when said release button is not operated, and to disconnect said signal line and said voltage line from each other when said release button is operated.

* * * * *